(12) United States Patent
Miao

(10) Patent No.: US 8,160,066 B2
(45) Date of Patent: Apr. 17, 2012

(54) METHOD FOR MOBILE IPV6 DATA TRAVERSING STATE FIREWALL

(75) Inventor: Fuyou Miao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 416 days.

(21) Appl. No.: 11/852,838

(22) Filed: Sep. 10, 2007

(65) Prior Publication Data
US 2008/0056252 A1 Mar. 6, 2008

Related U.S. Application Data

(63) Continuation of application No. PCT/CN2006/000388, filed on Mar. 14, 2006.

(30) Foreign Application Priority Data

Mar. 15, 2005 (CN) .......................... 2005 1 0055312

(51) Int. Cl.
H04L 12/28 (2006.01)
H04L 12/56 (2006.01)
G06F 15/16 (2006.01)
G06F 17/00 (2006.01)

(52) U.S. Cl. ......................................... 370/392; 726/11
(58) Field of Classification Search .................. None
See application file for complete search history.

(56) References Cited

U.S. PATENT DOCUMENTS 7,385,946 B2 * 6/2008 Devarapalli et al. .......... 370/328
7,436,804 B2 * 10/2008 O'Neill .......................... 370/331
2001/0028647 A1 * 10/2001 Teraoka ......................... 370/389
2002/0080752 A1 6/2002 Johansson et al.
2003/0115328 A1 * 6/2003 Salminen et al. ............. 709/225
2003/0142673 A1 * 7/2003 Patil et al. ..................... 370/392
2004/0057384 A1 * 3/2004 Le et al. ........................ 370/252

(Continued)

FOREIGN PATENT DOCUMENTS
CN 100542171 C 9/2009
(Continued)

OTHER PUBLICATIONS

Johnson et al., "Mobility Support in IPv6," *IETF*, 1-165 (Jun. 2004).

(Continued)

*Primary Examiner* — Chirag Shah
*Assistant Examiner* — Suk Jin Kang
(74) *Attorney, Agent, or Firm* — Leydig, Voit & Mayer, Ltd.

(57) ABSTRACT

A method for mobile IPv6 data traversing a state firewall includes: creating an entry item of a firewall including a source HoA, a source CoA, a destination HoA, a destination CoA, a source port, a destination port and a protocol number; matching the source CoA, destination CoA, source port, destination port and protocol number of the data packet with those in the entry item; if unsuccessful, matching the source HoA or CoA, destination CoA or HoA, source port, destination port and protocol number of the data packet with those in the entry item; if successful, replacing the source CoA or destination CoA in the entry item by those of the data packet, and allowing the data packet to traverse the firewall, which improves the efficiency of a data packet traversing a firewall and guarantees that the data packet passing the filtering of firewall is able to traverse the firewall normally.

8 Claims, 3 Drawing Sheets

U.S. PATENT DOCUMENTS

| | | | | |
|---|---|---|---|---|
| 2004/0100951 | A1* | 5/2004 | O'neill | 370/389 |
| 2005/0165917 | A1* | 7/2005 | Le et al. | 709/220 |
| 2005/0268332 | A1* | 12/2005 | Le et al. | 726/11 |

FOREIGN PATENT DOCUMENTS

| | | | |
|---|---|---|---|
| JP | 2003-168955 A | | 1/2005 |
| WO | WO 2004/028053 A1 | | 4/2004 |
| WO | WO 2004/030271 A2 | * | 4/2004 |
| WO | WO 2006/097040 A1 | | 9/2006 |

OTHER PUBLICATIONS

Le et al., "Mobile IPv6 and Firewalls Problem Statement," *IETF*, mip6(1): 1-22 (Feb. 20, 2005) http://draft-ietf-mip6-firewalls-01.txt.

O'Neill, "MIPv6 Care of Address Option," *IETF*, 1-17 (Sep. 19, 2002) http://draft-oneill-mipv6-cao.00.txt.

Shen et al., "Firewall Traversal for Mobile IPv6," *IETF Standard Working Draft*, 1-12 (Mar. 2005) http://draft-miao-mip6-ft-00.txt.

1st Office Action in corresponding European Application No. 08160077.7 (Dec. 29, 2008).

Extended European Search Report in corresponding European Application No. 08160077.7 (Sep. 17, 2008).

Notice of Opposition in corresponding European Application No. 08160077.7 (Oct. 7, 2010).

Written Opinion of the International Searching Authority in corresponding PCT Application No. PCT/CN2006/000388 (Jun. 22, 2006).

Le et al., "Mobile IPv6 and Firewalls Problem statement," Aug. 2004, Internet Draft, The Internet Society, Reston Virginia.

"Understanding Mobile IPv6," Windows Server 2003, Apr. 2004, Microsoft Windows, Redmond, Washington.

* cited by examiner

METHOD FOR MOBILE IPV6 DATA TRAVERSING STATE FIREWALL

This application is a continuation of International Patent Application No. PCT/CN2006/000388, filed Mar. 14, 2006, which claims priority to Chinese Patent Application No. 200510055312.3, filed Mar. 15, 2005, both of which are hereby incorporated by reference.

FIELD OF THE INVENTION

The present invention relates to the Mobile Internet Protocol version 6 (mobile IPv6 or MIPv6) data transfer technology, and more particularly, to a method for mobile IPv6 data traversing a state firewall (FW).

BACKGROUND OF THE INVENTION

In the mobile IPv6 data transfer technology, every Mobile Node (MN) has a fixed Home Address (HoA), which is independent of the current location by which the MN accesses the Internet and is directly used in a home link of the MN. When the MN moves outside the home link, the current location information of the MN is provided over a Care of Address (CoA) acquired from a Foreign Agent (FA).

A Communication Node (CN) is a communication opposite end of the MN. A bidirectional tunnel mode and a route optimization mode may be used for transferring data packets between the MN and the CN.

In the route optimization mode, data packets are directly transferred between the MN and the CN supporting mobile IPv6, and the CN must know the new CoA of the MN after moving.

In the bidirectional tunnel mode, data packets are transferred between the MN and the CN over a Home Agent (HA), and the CN need not know the new CoA of the MN after moving. For example, when the MN receives a data packet from the CN, the data packet will be sent to the HoA of the MN because the HoA of the MN is unchanged. The data packet is firstly sent from the CN to a Home Agent (HA), and then is forwarded to the MN by the HA.

The bidirectional tunnel mode will result in a severe transfer delay because the data packet is forwarded over the HA while the route optimization mode eliminates such a disadvantage of the bidirectional tunnel mode.

In order to implement the route optimization transfer of data packets between the MN and the CN supporting mobile IPv6, the MN needs to notify the new CoA of the MN to the HA and the CN once the location of the MN is changed.

After the MN moves to a link apart from the home link, the procedure for the MN notifying the new CoA of the MN to the HA and the CN includes a Return Routable Procedure (RRP) and an exchange Binding Update/Binding Acknowledgement (BU/BA) procedure, which are implemented as follows.

(1) Return Routable Procedure

Firstly, the MN sends to the CN a CoA test initiation packet and sends to the CN a HoA test initiation packet over the HA.

Secondly, the CN sends to the MN a CoA test response packet and sends to the MN a HoA test response packet over the HA.

(2) Exchange Binding Update/Binding Acknowledgement Procedure

After finishing the return routable procedure, the MN initiates the exchange binding update procedure and notifies the CN and the HA of the new CoA of the MN after moving. After receiving the new CoA, the CN adds an item for the MN in the binding buffer of the CN to store the new CoA. In other words, communication registration is finished. After receiving the new CoA, the HA adds an item for the MN in the binding agent of the HA to store the new CoA and home registration is finished.

Hereafter, both the CN and the HA send to the MN an exchange binding update packet acknowledgement. In this way, the binding acknowledgement procedure is accomplished.

After the communication registration and the home registration are accomplished, the new CoA of the MN is registered to the CN and the HA. Therefore, the route optimization mode may be used to transfer data packets between the MN and the CN.

Before data packets are transferred between the MN and the CN, it is necessary to establish a Transport Control Protocol (TCP) connection between the MN and the CN. There are three procedures for establishing the TCP connection.

In a network protected by a firewall, Node A protected by the firewall initiates, through the firewall, a TCP connection synchronization (SYN) request to Node B outside of the network protected by the firewall, and the SYN request contains the address of Node B, i.e. a destination address, the Port of Node B, i.e. a destination port, and the protocol number between Node A and Node B. Node B returns, through the firewall, to Node A an SYN request acknowledgement (SYN-ACK), and the SYN request acknowledgement contains the address of Node A, i.e. a source address, and the port of Node A, i.e. a source port. Up to now, a TCP connection is established between Node A and Node B. As can be seen easily, it is possible to establish a TCP connection successfully after a communication registration is finished between Node A and Node B.

Additionally, in order to transfer data packets in security between the MN and the CN, a firewall (FW) is set between the MN and the CN for intercepting a malicious node. There are many varieties of firewalls. The state firewall (state FW) adopts a state packet filtering technology, and is widely applied due to the good security and the high speed. The following firewall is referred to as the state firewall.

While establishing a TCP connection, a firewall will create an entry item according to five elements interacting in the TCP connection, including a source address, a destination address, a source port, a destination port and a protocol number, and the entry item includes the above-mentioned five elements. Therefore, when a data packet outside the network protected by the firewall traverses the firewall and enters the network protected by the firewall, if the destination address and the source address included in the header of the data packet are the same as the destination address and the source address in the entry item of the firewall respectively as well as the source port, the destination port and the protocol number of the data packet are also the same as the source port, the destination port and the protocol number in the entry item of the firewall, the firewall allows the data packet to traverse it; otherwise, the firewall intercepts the data packet and drops the intercepted data packet, which is also called filtering.

At present, because the address of the MN will change with the change of the location of the MN, there are the following problems when a data packet traverses a firewall. Suppose the communication registration between the MN and the CN is successfully completed after the location of the MN changes, i.e., the CN has acquired a new CoA of the MN.

For one example, the CN is in the network protected by the firewall and the MN is outside the network protected by the firewall.

FIG. 1(a) is a schematic diagram for exchanging a data packet between a mobile node and a communication node through a firewall when the communication node is in the network protected by the firewall and the mobile node is outside the network protected by the firewall. The mobile node sends a data packet to the communication node from a new CoA of the mobile node. When traversing the firewall, the data packet is unable to pass the filtering of the firewall because there is no item matching the new CoA of the mobile node in the entry item of the firewall. Therefore, the data packet is dropped. In this way, the data packet sent to the communication node in the network protected by the firewall is lost when the mobile node outside the network protected by the firewall moves to a new link.

In this case, if the communication node in the network protected by the firewall firstly sends a data packet to the mobile node outside the network protected by the firewall, the firewall will newly add an item in the entry item after the data packet traverses the firewall. The item includes such five elements as an address of the communication node, a new CoA of the mobile node, a port of the communication node, a new port of the mobile node, and a protocol number between the communication node and the mobile node. Therefore, when the mobile node resends a data packet to the communication node and the data packet traverses the firewall, the data packet may match the newly-added entry item of the firewall and pass the filtering of the firewall, thereby traversing the firewall successfully.

For another example, the MN is in the network protected by the firewall and the CN is outside the network protected by the firewall.

FIG. 1(b) is a schematic diagram for exchanging a data packet between a mobile node and a communication node through a firewall when the mobile node is in the network protected by the firewall and the communication node is outside the network protected by the firewall. If the communication node sends a data packet to the mobile node moving to a new link, the destination address of the data packet can not match the destination address in the entry item because the entry item of the firewall does not include the new CoA of the mobile node after moving, but only the address of the mobile node before moving when the data packet traverses the firewall, thereby the data packet fails to pass the filtering of the firewall, and the data packet is dropped.

In this case, if the mobile node in the network protected by the firewall firstly sends a data packet to the communication node outside the network protected by the firewall, the firewall will newly add an item in the entry item after the data packet traverses the firewall. The item includes such five elements as an address of the communication node, a new CoA of the mobile node, a port of the communication node, a new port of the mobile node, and a protocol number between the communication node and the mobile node. Therefore, when the communication node resends a data packet to the mobile node and the data packet traverses the firewall, the data packet may match the newly-added entry item of the firewall and pass the filtering of the firewall, thereby traversing the firewall successfully.

As can be seen from the above two cases, no matter whether the CN is in the network protected by the firewall and the MN is outside the network protected by the firewall or the MN is in the network protected by the firewall and the CN is outside the network protected by the firewall, there occurs the same problem that a data packet fails to traverse the firewall and is dropped due to the change of the address of the MN caused by the change of the location of the MN. However, the problem will not occur when the data packet in the network protected by the firewall traverses the firewall. Therefore, the following problem that a data packet traverses a firewall is the existing problem which occurs when the data packet outside the network protected by the firewall traverses the firewall.

At present, in order to solve the problem, some solutions adopt a filtering method based on the home address of the MN. Because the HoA keeps unchanged when the MN moves, and the HoA is contained in a Home Address Destination Option of the data packet sent from the MN to the CN and is contained in a Type 2 Routing Header of the data packet sent from the CN to the MN, the entry item of the firewall always includes such five fixed elements as a source address, a destination address, a source port, a destination port and a protocol number for the MN and the CN.

If the CN is in the network protected by the firewall and the MN is outside the network protected by the firewall, when the MN sends a data packet to the CN, five elements in the entry item of the firewall for matching includes: (1) a source address: the HoA of the MN, (2) a destination address: the address of the CN, (3) a source port: the port of the MN, (4) a destination port: the port of the CN, (5) a protocol number between the CN and the MN. Because the data packet sent from the MN to the CN contains the Home Address Destination Option, the firewall is able to extract the HoA of the MN from the Home Address Destination Option to replace the new CoA of the MN as a source address. Therefore, the changed source address of the MN is able to match the source address in the entry item. In this way, the data packet is able to pass the filtering of the firewall by the filtering method based on the HoA of the MN.

If the MN is in the network protected by the firewall and the CN is outside the network protected by the firewall, when the CN sends a data packet to the MN, five elements in the entry item of the firewall for matching includes: (1) a source address: the address of the CN, (2) a destination address: the HoA of the MN, (3) a source port: the port of the CN, (4) a destination port: the port of the MN, (5) a protocol number between the CN and the MN. Because the packet sent from the CN to the MN contains the Type 2 Routing Header, the firewall is able to extract the HoA of the MN from the Type 2 Routing Header to replace the new CoA of the MN as a destination address. Therefore, the changed destination address of the MN is able to match the destination address in the entry item. In this way, the data packet is able to pass the filtering of the firewall by using the filtering method based on the HoA of the MN.

FIG. 2 is a flowchart for the mobile IPv6 data outside a network protected by a firewall traversing the firewall in the prior art. Suppose the communication registration has been completed between an MN and a CN after the MN moves to a link apart from the home link, the port and protocol number of the MN match the port and protocol number of the CN, the address of the MN in the home link is the home address, the address of the MN in the link apart from the home link is the CoA, and the address of the CN is Home address 1. The method for mobile IPv6 data outside a network protected by the firewall traversing the firewall in the prior art includes the following steps.

Steps 200~201: The firewall intercepts a data packet outside a network protected by the firewall and determines whether the source address, the destination address, the source port, the destination port and the protocol number of the data packet match five elements in the entry item of the firewall; if the matching is successful, Step 208 is performed; otherwise, Step 202 is performed.

This step is described by two examples.

For one example, if the MN is outside the network protected by the firewall and the CN is in the network protected by the firewall, the entry item includes: a source home address, a destination home address 1, a source port, a destination port and a protocol number. If the MN is in the home link, the source address of the data packet sent from the MN to the CN is still the home address of the MN, i.e. the source home address, and the destination address is the address of the CN, i.e. the destination home address 1, which are able to match the source home address and the destination home address 1 in the entry item. Therefore, the data packet is able to pass the filtering of the firewall, and Step 208 is performed. If the MN moves to a link apart from the home link, the source address of the data packet sent from the MN to the CN is not the home address of the MN but a new CoA which is unable to match the source home address in the entry item. Therefore, the data packet is unable to pass the filtering of the firewall, and Step 202 is performed.

For another example, if the CN is outside the network protected by the firewall and the MN is in the network protected by the firewall, the entry item includes: a source home address 1, a destination home address, a source port, a destination port and a protocol number. If the MN is in the home link, the source address of the data packet sent from the CN to the MN is still the address of the CN, i.e. the source home address 1, and the destination address is the home address of the MN, i.e. the destination home address, which are able to match the source home address 1 and the destination home address in the entry item. Therefore, the data packet is able to pass the filtering of the firewall, and Step 208 performed. If the MN moves to a link apart from the home link, the address of the MN is a new CoA, but the destination address of the data packet sent from the CN to the MN is still the home address of the MN. The destination address of the data packet is able to match the destination home address in the entry item. Therefore, the data packet is able to pass the filtering of the firewall. However, the data packet is unable to be sent to the MN because the address of the MN is changed to the CoA. In this case, even though passing the address matching and Step 208 is performed, the data packet will be dropped.

Steps 202~203: Query whether the data packet contains a Home Address Destination Option; if the data packet contains a Home Address Destination Option, extract the home address from the Home Address Destination Option to replace the source CoA of the data packet, and Step 204 is performed; otherwise, Step 205 is performed.

In this step, if the data packet includes the Home Address Destination Option, it indicates that the data packet is sent from the MN to the CN, i.e., the MN is outside the network protected by the firewall and the CN is in the network protected by the firewall. Therefore, the five elements in the entry item includes a source home address, a destination home address 1, a source port, a destination port and a protocol number.

Step 204: Match the replaced source address of the data packet, i.e. the home address of the MN with the source home address in the entry item; if the home address of the MN matches the source home address in the entry item, Step 208 is performed; otherwise, Step 209 is performed.

In this step, the replaced source address of the data packet, i.e. the home address of the MN matches the source address in the entry item; if the home address of the MN matches the source address in the entry item, the matching is successful; otherwise, the matching is unsuccessful.

Steps 205~206: Query whether the data packet contains a Type 2 Routing Header; if the data packet contains a Type 2 Routing Header, extract the home address from the Type 2 Routing Header to replace the destination CoA of the data packet, and Step 207 is performed; otherwise, Step 209 is performed.

In this step, if the data packet includes the Type 2 Routing Header, it indicates that the data packet is sent from the CN to the MN, i.e. the CN is outside the network protected by the firewall and the MN is in the network protected by the firewall. Therefore, the five elements in the entry item includes a source home address 1, a destination home address, a source port, a destination port and a protocol number.

Step 207: Match the replaced destination address of the data packet, i.e. the home address of the MN with the destination home address in the entry item; if the home address of the MN matches the destination home address in the entry item, Step 208 is performed; otherwise, Step 209 is performed.

In this step, the replaced destination address of the data packet, i.e. the home address of the MN matches the destination home address in the entry item; if the home address of the MN matches the destination address in the entry item, the matching is successful; otherwise, the matching is unsuccessful.

Step 208: The data packet traverses the firewall successfully.

Step 209: The data packet is dropped.

The method mentioned above is for mobile IPv6 data outside a network protected by a firewall traversing the firewall. There are still disadvantages using the conventional filtering method based on the home address of the MN when a data packet is sent from the outside of the network protected by the firewall to the inside of the network protected by the firewall. For one thing, as can be seen from the procedure of FIG. 2, the conventional method needs to perform the matching for a data packet of which the current address is unable to match the corresponding address in the entry item by the filtering method based on the home address of the MN, i.e., the conventional method needs to query the option or header of the data packet, which needs a large amount of time and result a low efficiency of traversing the firewall; for another, as can be seen from the above method, when the MN is in the network protected by the firewall and the CN is outside the network protected by the firewall, even though the matching using the conventional filtering method based on the home address of the MN is successful, the data packet passing the filtering of the firewall will be dropped because the destination address changes, which makes the data packet unable to traverse the firewall normally. The detailed procedure has been described through the second example of Steps 200~201.

It should be noted that the above method is on how the current mobile IPv6 data outside a network protected by a firewall traverses the firewall and when the data packet is sent from the inside of the network protected by the firewall to the outside of the network protected by the firewall, the above filtering method based on the home address of the MN is able to filter the data packet normally; the problem that the data packet traverses the firewall does not occur.

SUMMARY OF THE INVENTION

The present invention provides a method for mobile IPv6 data traversing a state firewall, which is able to reduce the processing time of the state firewall, improve the efficiency of a data packet traversing the state firewall, and guarantee that the data packet traverses the state firewall successfully.

A method for mobile IPv6 data traversing a state firewall includes:

creating an entry item of a firewall, wherein the entry item comprises a source Home Address (HoA), a source Care of Address (CoA), a destination HoA, a destination CoA, a source port, a destination port and a protocol number;

performing, when a data packet is sent from the inside of a network protected by the firewall to the outside of the network protected by the firewall, a first matching between the source CoA, the destination CoA, the source port, the destination port and the protocol number of the data packet and the source CoA, the destination CoA, the source port, the destination port and the protocol number in the entry item;

allowing the data packet to traverse the firewall if the first matching is successful;

extracting a source HoA from the data packet and performing a second matching between the source HoA extracted from the data packet, the destination CoA, the source port, the destination port and the protocol number of the data packet and the source HoA, the destination CoA, the source port, the destination port and the protocol number in the entry item if the first matching is unsuccessful; and replacing the source CoA in the entry item by the source CoA of the data packet if the second matching is successful, and allowing the data packet to traverse the firewall.

A method for mobile IPv6 data traversing a state firewall includes:

creating an entry item of a firewall, wherein the entry item comprises a source Home Address (HoA), a source Care of Address (CoA), a destination HoA, a destination CoA, a source port, a destination port and a protocol number;

performing, when a data packet is sent from the inside of a network protected by the firewall to the outside of the network protected by the firewall, a first matching between the source CoA, the destination CoA, the source port, the destination port and the protocol number of the data packet and the source CoA, the destination CoA, the source port, the destination port and the protocol number in the entry item;

allowing the data packet to traverse the firewall if the first matching is successful;

extracting a destination HoA from the data packet, and performing a second matching between the source CoA, the destination HoA extracted from the data packet, the source port, the destination port and the protocol number of the data packet and the source CoA, the destination HoA extracted from the data packet, the source port, the destination port and the protocol number in the entry item if the first matching is unsuccessful; and replacing the destination CoA in the entry item by the destination CoA of the data packet if the second matching is successful, and allowing the data packet to traverse the firewall.

A method for traversing a firewall, comprising:

creating an entry item of the firewall, wherein the entry item comprises a, source of Home Address (HoA), a source Care of Address (CoA), a destination HoA, a destination CoA, a source port, a destination port and a protocol number;

performing, when a data packet is sent from inside a network protected by the firewall to outside the network, a first matching between (1) the source CoA, the destination CoA, the source port, the destination port and the protocol number of the data packet and (2) the source CoA, the destination CoA, the source port, the destination port and the protocol number in the entry item;

allowing the data packet to traverse the firewall if the first matching is successful;

extracting a source HoA from the data packet and performing a second matching between (1) the source HoA extracted from the data packet, the destination CoA, the source port, the destination port and the protocol number of the data packet and (2) the source HoA, the destination CoA, the source port, the destination port and the protocol number in the entry item if the first matching is unsuccessful; and replacing the source CoA in the entry item by the source CoA of the data packet if the second matching is successful, and allowing the data packet to traverse the firewall.

A method for traversing a firewall, comprising:

creating an entry item of the firewall, wherein the entry item comprises a source Home Address (HoA), a source Care of Address (CoA), a destination HoA, a destination CoA, a source port, a destination port and a protocol number;

performing, when a data packet is sent from the inside of a network protected by the firewall to outside the network, a first matching between (1) the source CoA, the destination CoA, the source port, the destination port and the protocol number of the data packet and (2) the source CoA, the destination CoA, the source port, the destination port and the protocol number in the entry item;

allowing the data packet to traverse the firewall if the first matching is successful;

extracting a destination HoA from the data packet and performing a second matching between (1) the source CoA, the destination HoA extracted from the data packet, the source port, the destination port and the protocol number of the data packet and (2) the source CoA, the destination HoA extracted from the data packet, the source port, the destination port and the protocol number in the entry item if the first matching is unsuccessful; and replacing the destination CoA in the entry item by the destination CoA of the data packet if the second matching is successful, and allowing the data packet to traverse the firewall.

As can be seen from the above-mentioned solution, the method of the present invention redefines the original entry item including five elements as a new entry item including such seven elements as a source HoA, a source CoA, a destination HoA, a destination CoA, a source port, a destination port and a protocol number. When a data packet traverses a firewall, the matching is performed firstly according to the source CoA, the destination CoA, the source port, the destination port and the protocol number. If the matching is unsuccessful, the Home Address Destination Option is queried to extract the HoA of the MN, in this way, the matching is performed according to the source HoA, the destination CoA, the source port, the destination port and the protocol number. If the matching is successful, the source CoA in the entry item is replaced by the source CoA of the data packet, in this way, the matching may be performed for subsequent data packets according to the source CoA, the destination CoA, the source port, the destination port and the protocol number and repeatedly querying the Home Address Destination Option to extract the HoA of the MN may be avoided. Or, when a data packet traverses a firewall, the matching is performed firstly according to the source CoA, the destination CoA, the source port, the destination port and the protocol number. If the matching is unsuccessful, the Type 2 Routing Header is queried to extract the HoA of the MN, the matching is performed according to the source CoA, the destination HoA, the source port, the destination port and the protocol number. If the matching is successful, the destination CoA in the entry item is replaced by the destination CoA of the data packet, in this way the matching may be performed for subsequent data packets according to the source CoA, the destination CoA, the source port, the destination port and the protocol number and repeatedly querying the Type 2 Routing Header to extract the HoA of the MN may be avoided. The method of the present invention reduces the processing time of the firewall, thereby improving the efficiency of a data packet traversing the firewall.

In addition, after the address is changed due to the movement of the MN, because the source CoA in the entry item is replaced by the source CoA of the data packet or the destination CoA in the entry item is replaced by the destination CoA of the data packet, the data packet traversing the firewall is able to reach the destination address successfully, so as to guarantee that the data packet traverses the firewall normally.

DETAILED DESCRIPTION OF THE INVENTION

The present invention includes: defining an entry item of a firewall including such seven elements as a source Home Address (HoA), a source Care of Address (CoA), a destination HoA, a destination CoA, a source port, a destination port and a protocol number, and performing the matching firstly according to five elements including the source CoA, the destination CoA, the source port, the destination port and the protocol number when a data packet traverses the firewall; if the matching is unsuccessful, performing the matching according to the source HoA, the destination CoA, the source port, the destination port and the protocol number in the entry item; if the matching is successful, replacing the source CoA in the entry item by the source CoA of the data packet; or, performing the matching firstly according to five elements including the source CoA, the destination CoA, the source port, the destination port and the protocol number when a data packet traverses the firewall; if the matching is unsuccessful, performing the matching according to the source CoA, the destination HoA, the source port, the destination port and the protocol number in the entry item; if the matching is successful, replacing the destination CoA in the entry item by the destination CoA of the data packet. The method of the present invention improves the efficiency of the data packet traversing the firewall and guarantees that the data packet passing the filtering of the firewall is able to traverse the firewall normally.

This invention is described in detail as follows with reference to the accompanying drawings and embodiments to make the objective, technical solution and merits of the present invention more apparent.

Figure 1A:
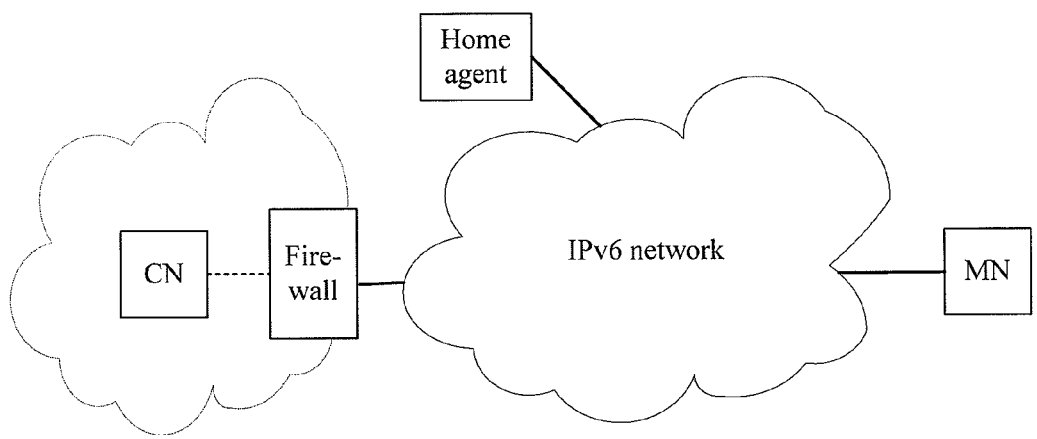
FIG. 1(a) is a schematic diagram for exchanging a data packet between a mobile node and a communication node through a firewall when the communication node is in a network protected by the firewall and the mobile node is outside of the network protected by the firewall.
Figure 1B:
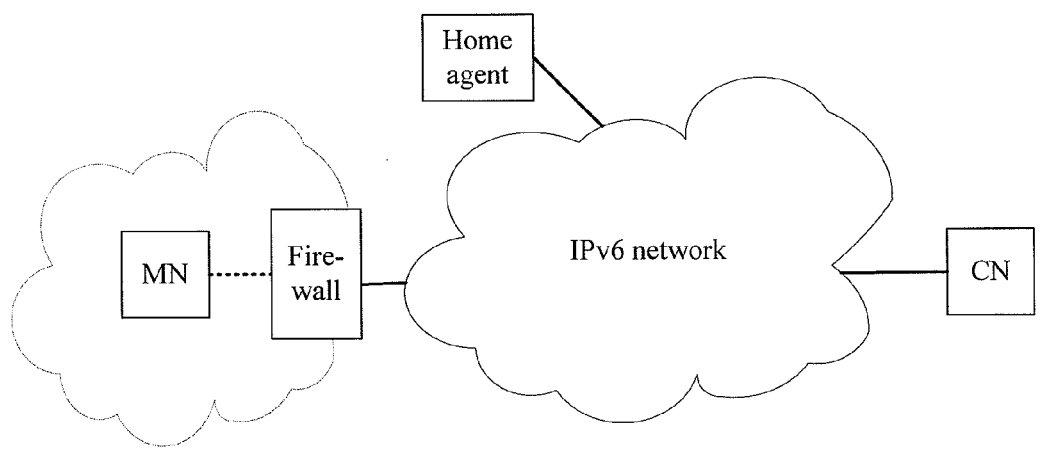
FIG. 1(b) is a schematic diagram for exchanging a data packet between a mobile node and a communication node through a firewall when the mobile node is in a network protected by the firewall and the communication node is outside of the network protected by the firewall.
Figure 2:
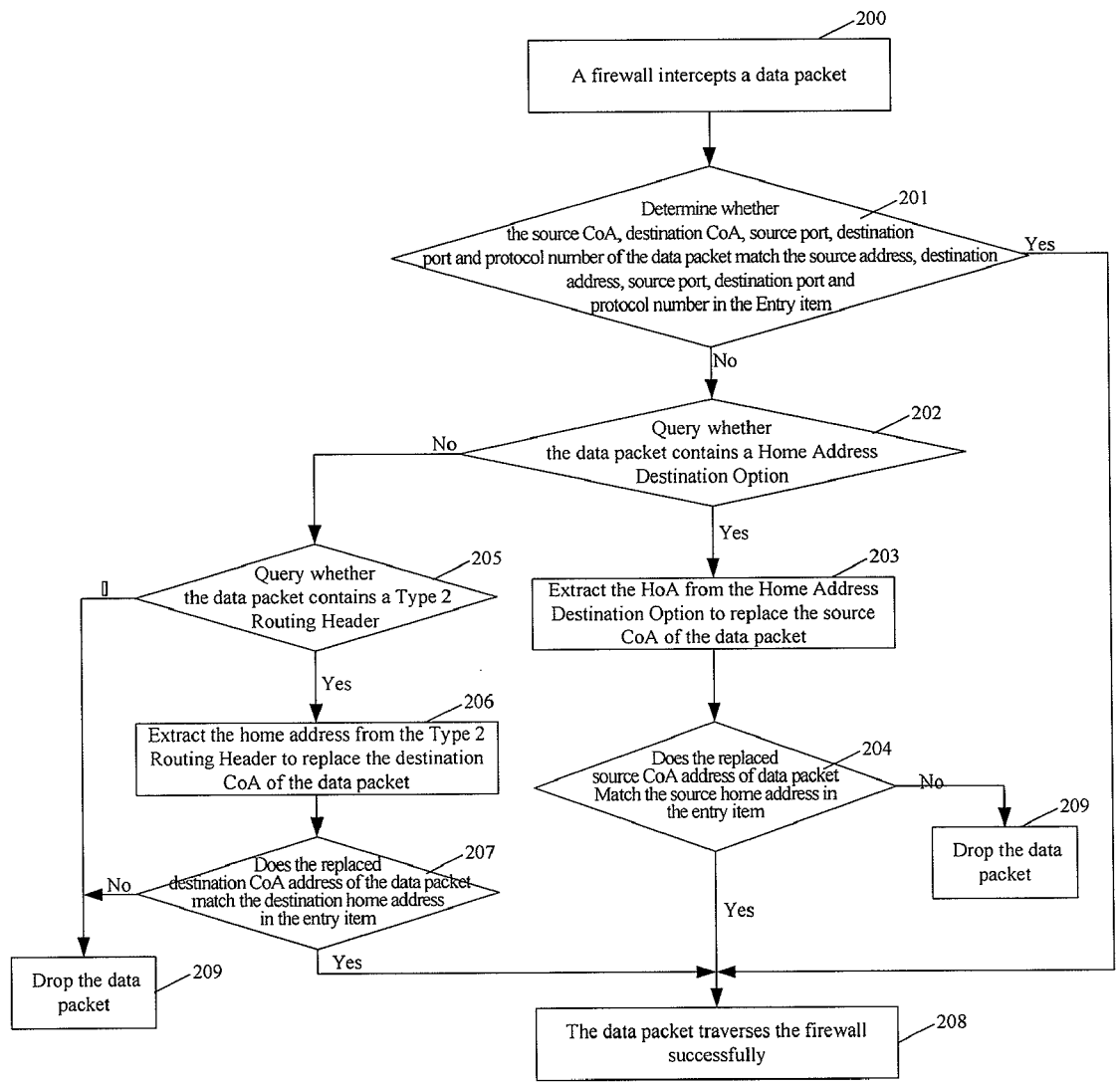
FIG. 2 is a flowchart for the mobile IPv6 data outside a network protected by a firewall traversing the firewall in the related art.
Figure 3:
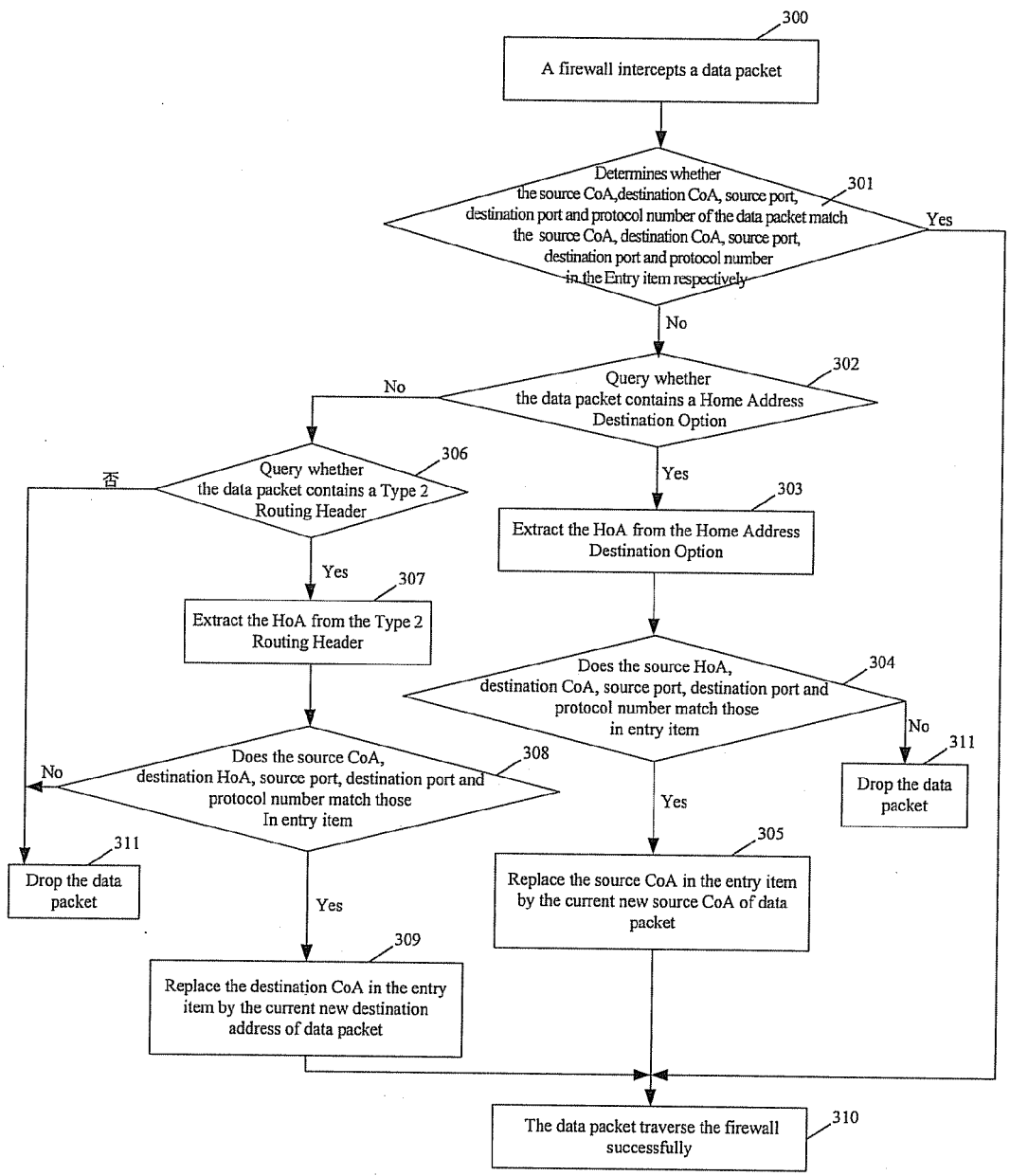
FIG. 3 is a flowchart for the mobile IPv6 data traversing a firewall in accordance with an embodiment of the present invention.

FIG. 3 is a flowchart for the mobile IPv6 data traversing a firewall in accordance with an embodiment of the present invention. Supposed that the communication registration has been completed between an MN and a CN after the MN moves to a link apart from a home link, the port and protocol number of the MN match the port and protocol number of the CN respectively, the address of the MN in the home link is the home address, the address of the MN in the link apart from the home link is the CoA, and the address of the CN is a Home address 1. In addition, the entry item of the firewall is set as an entry item including such seven elements as a source Home Address (HoA), a source Care of Address (CoA), a destination HoA, a destination CoA, a source port, a destination port and a protocol number. The method for mobile IPv6 data traversing the firewall in accordance with the present invention includes the following steps.

Steps 300~301: A firewall intercepts a data packet and determines whether the source address, the destination address, the source port, the destination port and the protocol number of the data packet respectively match such five elements as the source CoA, the destination CoA, the source port, the destination port and the protocol number in the entry item of the firewall; if the matching is successful, Step 310 is performed; otherwise, Step 302 is performed.

With regard to this step, two cases are described as follows.

For one example, if the data packet is sent from an MN to a CN through a firewall, the destination HoA is the destination CoA, and the entry item includes: a source CoA, a destination HoA, a source port, a destination port and a protocol number. If the MN is in the home link and does not move, the source CoA in the entry item is the source HoA, and the source address of the data packet sent from the MN to the CN is still the HoA of the MN, i.e. the source HoA, and the destination address is the address of the CN, i.e. a destination HoA 1, which are able to match the source CoA and destination HoA 1 in the entry item; therefore, the data packet is able to pass the filtering of the firewall, and Step 310 is performed. If the MN moves to a link apart from the home link, the source address of the data packet sent from the MN to the CN is not the HoA of the MN any more, but a new CoA; the firewall determines whether the new CoA matches the source CoA in the entry item; if the new CoA matches the source CoA in the entry item, Step 310 is performed; otherwise, Step 302 is performed.

For another example, if a data packet is sent from a CN to an MN through a firewall, the source HoA is the source CoA, and the entry item includes: a source HoA 1, a destination CoA, a source port, a destination port and a protocol number. If the MN is in the home link and does not move, the destination CoA in the entry item is the destination HoA, and the source address of the data packet sent from the CN to the MN is still the address of the CN, i.e. the source HoA 1, and the destination address is the HoA of the MN, i.e. the destination HoA, which are able to respectively match the source HoA 1 and the destination CoA in the entry item; therefore, the data packet is able to pass the filtering of the firewall, and Step 310 is performed. If the MN moves to a link apart from the home link, the address of the MN is a new CoA, and the firewall determines whether the new CoA matches the destination CoA in the entry item; if the new CoA matches the destination CoA in the entry item, Step 310 is performed; otherwise, Step 302 is performed.

Steps 302~303: Query whether the data packet contains a Home Address Destination Option; if the data packet contains a Home Address Destination Option, extract the home address from the Home Address Destination Option, and Step 304 is performed; otherwise, Step 306 is perform.

In this step, if the data packet contains the Home Address Destination Option, it indicates that the data packet is sent from the MN to the CN.

Step 304: Take the HoA extracted from the data packet as the source address of the data packet, and respectively match the source HoA, the destination CoA, the source port, the destination port and the protocol number with the source HoA, the destination CoA, the source port, the destination port and the protocol number in the entry item; if the matching is successfully, Step 305 is performed; otherwise, Step 311 is performed.

Step 305: Replace the source CoA in the entry item by the current new source address of the data packet, i.e. the source CoA of the data packet.

In this step, the old CoA of the MN in the entry item is replaced by the new source CoA, which guarantees that subsequent data packets are able to perform the matching according to the method described by Steps 300~301 and repeatedly querying whether the data packets contain the Home Address Destination Option is avoided, thereby reducing the processing time of the firewall and improving the processing efficiency of the firewall.

Steps 306~307: Query whether the data packet contains a Type 2 Routing Header; if the data packet contains a Type 2 Routing Header, extract the HoA from the header, and Step 308 is performed; otherwise, Step 311 is performed.

In this step, if the data packet contains the Type 2 Routing Header, it indicates that the data packet is sent from the CN to the MN.

Step 308: Take the HoA extracted from the data packet as the destination address of the data packet, and respectively match the source CoA, the destination HoA, the source port, the destination port and the protocol number with the source CoA, the destination HoA, the source port, the destination port and the protocol number in the entry item; if the matching is successfully, Step 309 is performed; otherwise, Step 311 performed.

Step 309: Replace the destination CoA in the entry item by the current new destination address of the data packet, i.e. the destination CoA of the data packet.

In this step, the old CoA of the MN in the entry item is replaced by the new destination CoA, which guarantees that subsequent data packets are able to perform the matching according to the method described by Steps 300~301 and repeatedly querying whether the data packets contain the Type 2 Routing Header is avoided, thereby reducing the processing time of the firewall and improving the processing efficiency of the firewall.

Step 310: The data packet traverses the firewall successfully.

Step 311: Dropped the data packet.

The above-mentioned method for mobile IPv6 data traversing a firewall in accordance with the present invention not only improves the processing efficiency of the firewall by determining whether a data packet is sent from or to an MN and updating the CoA of the MN in the entry item, but also avoids that the data packet passing the filtering of the firewall is dropped due to the changed destination address.

The procedure for establishing an entry item of a firewall is as follows.

When a data packet is sent from a node in a network protected by the firewall or a node moving to the network protected by the firewall to a node outside the network protected by the firewall for the first time, the firewall creates an entry item. The source CoA and destination CoA of the data packet are the source CoA and the destination CoA in the entry item, and the port and protocol number of the data packet are also the same as the port and the protocol number in the entry item. The firewall determines that the source HoA and the destination HoA in the entry item by checking whether the Home Address Destination Option or the Type 2 Routing Header is contained in the data packet.

If the data packet contains the Home Address Destination Option, the source HoA in the entry item is the HoA in the Home Address Destination Option; otherwise, the source HoA in the entry item is the same as the source CoA in the entry item and the destination HoA in the entry item is the same as the destination CoA in the entry item.

If the data packet contains the Type 2 Routing Header, the destination HoA in the entry item is the HoA in the Type 2 Routing Header; otherwise, the destination HoA in the entry item is the same as the destination CoA in the entry item and the source HoA in the entry item is the same as the source CoA in the entry item.

The foregoing description is only a preferred embodiment of the present invention and is not for limiting the protection scope of the present invention.

What is claimed is:

1. A method for mobile IPv6 data traversing a state firewall, comprising:
    creating, by a firewall, an entry item of the firewall, wherein the entry item comprises a source Home Address (HoA), a source Care of Address (CoA), a destination HoA, a destination CoA, a source port, a destination port and a protocol number;
    performing, by the firewall, when a data packet is sent from a mobile node to a communication node through the firewall, a first matching between the source CoA, the destination CoA, the source port, the destination port and the protocol number of the data packet and the source CoA, the destination CoA, the source port, the destination port and the protocol number in the entry item;
    allowing, by the firewall, the data packet to traverse the firewall if the first matching is successful;
    if the first matching is unsuccessful, determining, by the firewall, whether the data packet contains a Home Address Destination Option, extracting the source HoA from the Home Address Destination Option if the data packet contains the Home Address Destination Option, and performing a second matching between the source HoA extracted from the Home Address Destination Option, the destination CoA, the source port, the destination port and the protocol number of the data packet and the source HoA, the destination CoA, the source port, the destination port and the protocol number in the entry item; and
    replacing, by the firewall, the source CoA in the entry item by the source CoA of the data packet if the second matching is successful, and allowing the data packet to traverse the firewall.

2. The method of claim 1, wherein the creating an entry item of the firewall comprises:
    determining the source CoA and the destination CoA in the entry item respectively according to the source CoA and the destination CoA of the data packet, and determining the source port, the destination port and the protocol number in the entry item according to the source port, the destination port and the protocol number of the data packet;
    determining the source HoA in the entry item according to the HoA in a Home Address Destination Option if the data packet contains the Home Address Destination Option; and
    determining that the source HoA in the entry item is the same as the source CoA in the entry item and the destination HoA in the entry item is the same as the destination CoA in the entry item if the data packet does not contain the Home Address Destination Option.

3. A method for mobile IPv6 data traversing a state firewall, comprising:
- creating, by a firewall, an entry item of the firewall, wherein the entry item comprises a source Home Address (HoA), a source Care of Address (CoA), a destination HoA, a destination CoA, a source port, a destination port and a protocol number;
- performing, by the firewall, when a data packet is sent from a communication node to a mobile node through the firewall, a first matching between the source CoA, the destination CoA, the source port, the destination port and the protocol number of the data packet and the source CoA, the destination CoA, the source port, the destination port and the protocol number in the entry item;
- allowing, by the firewall, the data packet to traverse the firewall if the first matching is successful;
- if the first matching is unsuccessful, determining, by the firewall, whether the data packet contains a Type 2 Routing Header, extracting the destination HoA from the Type 2 Routing Header if the data packet contains the Type 2 Routing Header, and performing a second matching between the source CoA, the destination HoA extracted from the Type 2 Routing Header, the source port, the destination port and the protocol number of the data packet and the source CoA, the destination HoA extracted from the data packet, the source port, the destination port and the protocol number in the entry item; and
- replacing, by the firewall, the destination CoA in the entry item by the destination CoA of the data packet if the second matching is successful, and allowing the data packet to traverse the firewall.

4. The method of claim 3, wherein the creating an entry item of the firewall comprises:
- determining the source CoA and the destination CoA in the entry item respectively according to the source CoA and the destination CoA of the data packet, and determining the source port, the destination port and the protocol number in the entry item according to the source port, the destination port and the protocol number of the data packet;
- determining the destination HoA in the entry item according to the HoA in a Type 2 Routing Header if the data packet contains the Type 2 Routing Header; and
- determining that the destination HoA in the entry item is the same as the destination CoA in the entry item and the source HoA in the entry item is the same as the source CoA in the entry item if the data packet does not contain the Type 2 Routing Header.

5. A firewall device, comprising:
- one or more processors coupled to a memory storing instructions for execution by the processors, configured to:
- create an entry item of the firewall, wherein the entry item comprises a source of Home Address (HoA), a source Care of Address (CoA), a destination HoA, a destination CoA, a source port, a destination port and a protocol number;
- perform, when a data packet is sent from a mobile node to a communication node through the firewall, a first matching between (1) the source CoA, the destination CoA, the source port, the destination port and the protocol number of the data packet and (2) the source CoA, the destination CoA, the source port, the destination port and the protocol number in the entry item;
- allow the data packet to traverse the firewall if the first matching is successful;
- if the first matching is unsuccessful, determine whether the data packet contains a Home Address Destination Option, extract the source HoA from the Home Address Destination Option if the data packet contains the Home Address Destination Option, and perform a second matching between (1) the source HoA extracted from the Home Address Destination Option, the destination CoA, the source port, the destination port and the protocol number of the data packet and (2) the source HoA, the destination CoA, the source port, the destination port and the protocol number in the entry item; and
- replace the source CoA in the entry item by the source CoA of the data packet if the second matching is successful, and allowing the data packet to traverse the firewall.

6. The firewall device of claim 5, wherein the one or more processors are configured to:
- determine the source CoA and the destination CoA in the entry item respectively according to the source CoA and the destination CoA of the data packet, and determining the source port, the destination port and the protocol number in the entry item according to the source port, the destination port and the protocol number of the data packet;
- determine the source HoA in the entry item according to the HoA in a Home Address Destination Option if the data packet contains the Home Address Destination Option; and
- determine that the source HoA in the entry item is the same as the source CoA in the entry item and the destination HoA in the entry item is the same as the destination CoA in the entry item if the data packet does not contain the Home Address Destination Option.

7. A firewall device, comprising:
- one or more processors coupled to a memory storing instructions for execution by the processors, configured to:
- create an entry item of the firewall, wherein the entry item comprises a source Home Address (HoA), a source Care of Address (CoA), a destination HoA, a destination CoA, a source port, a destination port and a protocol number;
- perform, when a data packet is sent from a communication node to a mobile node through the firewall, a first matching between (1) the source CoA, the destination CoA, the source port, the destination port and the protocol number of the data packet and (2) the source CoA, the destination CoA, the source port, the destination port and the protocol number in the entry item;
- allow the data packet to traverse the firewall if the first matching is successful;
- if the first matching is unsuccessful, determine whether the data packet contains a Type 2 Routing Header, extract the destination HoA from the Type 2 Routing Header if the data packet contains the Type 2Routing Header, and perform a second matching between (1) the source CoA, the destination HoA extracted from the Type 2 Routing Header, the source port, the destination port and the protocol number of the data packet and (2) the source CoA, the destination HoA extracted from the data packet, the source port, the destination port and the protocol number in the entry item; and
- replace the destination CoA in the entry item by the destination CoA of the data packet if the second matching is successful, and allow the data packet to traverse the firewall.

8. The firewall device of claim 7, wherein the one or more processors are configured to:

determine the source CoA and the destination CoA in the entry item respectively according to the source CoA and the destination CoA of the data packet, and determining the source port, the destination port and the protocol number in the entry item according to the source port, the destination port and the protocol number of the data packet; and determine the destination HoA in the entry item according to the HoA in a Type 2 Routing Header if the data packet contains the Type 2 Routing Header; and determine that the destination HoA in the entry item is the same as the destination CoA in the entry item and the source HoA in the entry item is the same as the source CoA in the entry item if the data packet does not contain the Type 2 Routing Header.

* * * * *